United States Patent [19]

Hasegawa et al.

[11] Patent Number: 5,037,252
[45] Date of Patent: Aug. 6, 1991

[54] MULTI-SPINDLE SYNCHRONOUS DRIVE UNIT AND GEAR CUTTING MACHINE EMPLOYING THE SAME

[75] Inventors: Mikio Hasegawa, Neyagawa; Takeshi Shiraishi, Ikoma, both of Japan

[73] Assignee: Matsushita Electric Industrial Co., Ltd., Osaka, Japan

[21] Appl. No.: 472,292

[22] Filed: Jan. 30, 1990

[30] Foreign Application Priority Data

Jan. 30, 1989 [JP] Japan ................................. 1-20039
Mar. 17, 1989 [JP] Japan ................................. 1-67075

[51] Int. Cl.$^5$ .................... B23F 1/00; G05B 11/32; G05B 19/407
[52] U.S. Cl. ..................................... 409/2; 318/625; 364/474.02; 364/474.12; 364/474.11; 409/15; 409/37
[58] Field of Search .................... 409/2, 15, 67, 70, 80, 409/37; 318/625; 364/474.02, 474.3, 474.11, 474.12

[56] References Cited

U.S. PATENT DOCUMENTS 4,253,050 2/1981 Angst ..................................... 409/12
4,625,156 11/1986 Komiya et al. .................. 318/625 X
4,629,956 12/1986 Nozawa et al. .............. 364/474.3 X
4,695,960 9/1987 Reimann et al. ..................... 364/474

FOREIGN PATENT DOCUMENTS 0079965 5/1982 European Pat. Off. .
2724602B2 3/1979 Fed. Rep. of Germany .
WO88/10171 12/1988 PCT Int'l Appl. .
2178558A 2/1987 United Kingdom .

*Primary Examiner*—Steven C. Bishop
*Attorney, Agent, or Firm*—Wenderoth, Lind & Ponack

[57] ABSTRACT

A multi-spindle synchronous drive unit for synchronously driving a plurality of spindles, includes a plurality of motors for respectively driving the spindles, a plurality of encoders for respectively detecting rotational positions of the motors, a plurality of phase locked loop control units for respectively controlling a drive of the motors and for receiving as feedback signals detection signals respectively output by the encoders, a reference pulse oscillator for outputting a pulse signal, and a plurality of multipliers for multiplying the pulse signal by multiplication factors respectively corresponding to rotational speed ratios of the spindles and for respectively outputting speed command pulse signals to the phase locked loop control unit.

4 Claims, 4 Drawing Sheets

MULTI-SPINDLE SYNCHRONOUS DRIVE UNIT AND GEAR CUTTING MACHINE EMPLOYING THE SAME

BACKGROUND OF THE INVENTION

The present invention relates to a multi-spindle synchronous drive unit for synchronously driving a plurality of spindles at arbitrary speeds, respectively and a gear cutting machine such as a gear shaving machine employing the multi-spindle synchronous drive unit.

For example, in a known gear shaving machine shown in FIG. 1, master gears 33 and 34 having a gear ratio identical with that of a gear cutter 31 and a gear blank 32 to be machined are, respectively, secured to spindles 35 and 36 so as to be engaged with each other such that the gear cutter 31 and the gear blank 32 are, respectively, mounted on the spindles 35 and 36. The spindle 35 having the gear cutter 31 mounted thereon is driven by a motor 37 and the gear cutter 31 and the gear blank 32 are synchronously driven so as to be rotated at an identical peripheral speed.

Meanwhile, in order to cut the gear blank 32 using the gear cutter 31, the spindles 35 and 36 are subjected to elastic torsional deformation at the time of machining of the gear blank 32 such that an elastic restoring force of the spindles 35 and 36 caused by the elastic torsional deformation urges the gear cutter 31 to a position yielding a predetermined depth of cut.

Furthermore, FIG. 2 shows a prior art synchronous drive unit in which a plurality of spindles are rotatably driven at a fixed speed ratio. In FIG. 2, motors 41 and 42 for driving spindles (not shown), respectively are provided and encoders 43 and 44 are, respectively, connected to the motors 41 and 42 such that feedback control for accurately rotating the motors 41 and 42 at preset speeds, respectively is performed by an NC (numerical control) unit 45. In addition, a gear shaving machine employing this prior art synchronous drive unit is also proposed.

However, in the known mechanical synchronous method employing the master gears as referred to above, since combination of the master gears is restricted, shaving of a gear blank having an arbitrary number of teeth cannot be performed and the depth of cut is fixed. Furthermore, an inconvenience is incurred in that it is impossible to control the cutting feed rate in order to minimize machining time.

Meanwhile, in the above mentioned prior art synchronous drive unit in which rotational speeds of the spindles are controlled by the NC unit, the speeed ratio of the sprindles can be set arbitrarily. However, the speed ratio is calculated digitally so as to determine a control value in the prior art synchronous drive unit. Therefore, in the case where the speed ratio is undividable, for example, 1:3, fraction is generated in the control value, thereby inevitably resulting in inaccurate positioning of the spindles. In the case of gear shaving, the number of teeth of the gear often assumes a prime number or odd number, the speed ratio of the gear to the gear cutter is often undividable and thus, it is difficult to perform shaving of the gear at high precision. Meanwhile, it is necessary to set the cutting feed rate in accordance with diameter of the gear blank. However, the cutting feed rate is manually reset based on experience by using the NC unit when the diameter of the gear blank has changed, which is time-consuming and lowers machining efficiency.

SUMMARY OF THE INVENTION

Accordingly, an essential object of the present invention is to provide, with a view to eliminating the above described drawbacks of the conventional multi-spindle synchronous drive units, a multi-spindle synchronous drive unit capable of synchronously driving a plurality of spindles at an arbitrary speed ratio accurately and a gear cutting machine employing the multi-spindle synchronous drive unit, which is capable of easily performing high precision machining and minimizing machining time.

In order to accomplish this object of the present invention, a multi-spindle synchronous drive unit for synchronous driving a plurality of spindles, according to the present invention comprises: a plurality of motors for driving said spindles, respectively; a plurality of encoders for detecting rotational positions of said motors, respectively, which are, respectively, attached to said motors; a plurality of phase locked loop (PLL) control means for controlling a driving of said motors, respectively, which receive, as feedback signals, detection signals of said encoders, respectively; a reference pulse oscillator for outputting a pulse signal; and a plurality of multipliers which multiply into speed command pulse signals, the pulse signal by multiplication factors corresponding to rotational speed ratios of said spindles, respectively, so as to input the speed command pulse signals to said phase locked loop control means, respectively.

In a control method requiring stability at fixed speeds, a PLL control means incorporating a reference pulse generator is known.

Advantageously, a voltage-frequency converter for outputting pulse signals of frequencies corresponding to varying command speeds is provided as a control means used at that time of speed change from a state of synchronous drive at fixed speeds and the pulse signals of the voltage-frequency converter are, respectively, inputted to the PLL control means through a switching means.

Meanwhile, a gear cutting machine of the present invention includes first and second motors for driving a gear cutter and a gear blank, respectively, first and second PLL control means for controlling drive of the first and second motors, respectively, and a pulse extracting means which is provided on at least one of the first and second PLL control means so as to extract pulses from a corresponding one of the speed command pulse signals in accordance with an amount of shift of a rotational phase of a corresponding one of the first and second motors.

Meanwhile, it is desirable that the number of pulses extracted during a unit time period by the pulse extracting means is set so as to be proportional to a ratio of a rotational speed of the gear cutter at the time of machining to a reference rotational speed of the gear cutter.

In accordance with the present invention, the pulse signal from the common pulse oscillator is multiplied by the multiplication factors proportional to the rotational speeds of the respective spindles so as to obtain the speed command pulse signals such that the speed command pulse signals are, respectively, inputted to the PLL control means, whereby feedback control of the motors for driving the respective motors is preformed by the PLL control means.

Accordingly, in accordance with the present invention, the respective spindles can be synchronously driven at an arbitrary speed ratio. Meanwhile, since the control value does not have the fraction produced in the NC unit and PLL control enabling highly accurate rotational control is performed, it becomes possible to perform a highly accurate synchronous drive of the motors. Furthermore, since the speed command pulse signals of frequencies in the predetermined range are obtained by multiplying the pulse signal outputted from the reference pulse oscillator, the pulse signal outputted from the reference pulse oscillator may be of a low frequency of, for example, several hundreds KHz. Namely, the pulse signal of the reference pulse oscillator is not required to have a frequency of, for example several GHz necessary in frequency division, thereby resulting in a reduction of production cost of the multi-spindle synchronous drive unit.

Meanwhile, since the reference pulse oscillator cannot change the output pulse linearly, another drive control is required to be performed at the time of speed change such as start, stop, etc. and it might be difficult to perform changeover of drive control therebetween. However, since the speed command signals are inputted to the PLL control means through the switching means by using the voltage-frequency converter, changeover between synchronous drive at fixed speeds and drive at the time of speed change can be smoothly performed by the simple arrangement.

Furthermore, if the above mentioned multi-spindle synchronous drive unit is applied to synchronous drive of the gear cutter and the gear blank of the gear cutting machine, high precision machining of the gear can be performed. Since an amount of shift of the rotational phases of the motors at the time of machining can be set at an arbitrary value by the pulse extracting means, an optimum amount of shift of the rotational phases can be obtained.

In addition, the number of pulses extracted during a unit time period is set so as to the be proportional to ratio of rotational speed at the time of machining to a predetermined reference rotational speed. Thus, if any one of the motors is set at its maximum rotational speed in order to minimize machining time, a cutting feed rate corresponding to peripheral speed of the workpiece at that time is automatically set, so that a cutting feed rate leading to a minimum machining time can be automatically set, thereby minimizing the machining time of the gear.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 1:
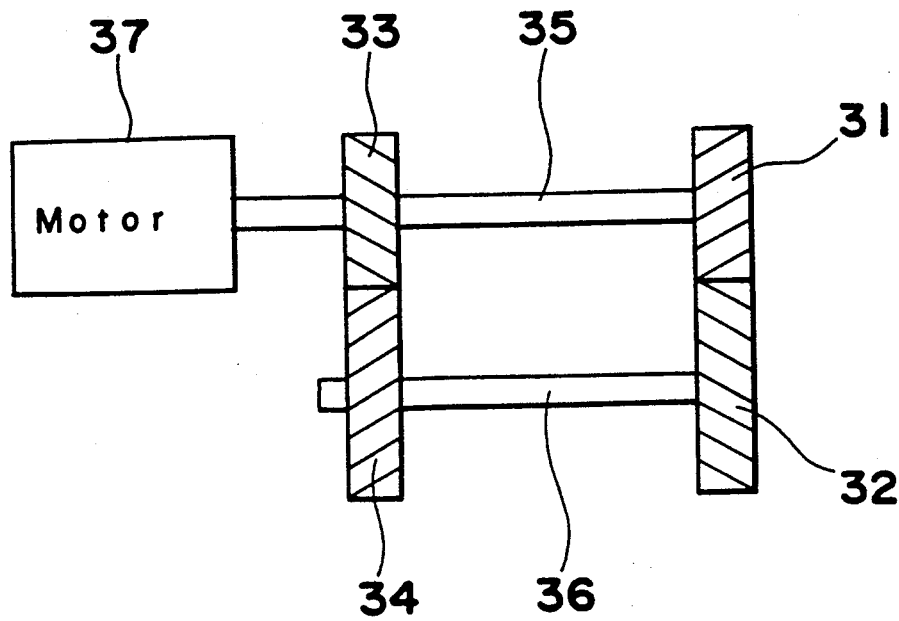
FIG. 1 is a schematic view of a prior art gear shaving machine (already referred to)
Figure 2:
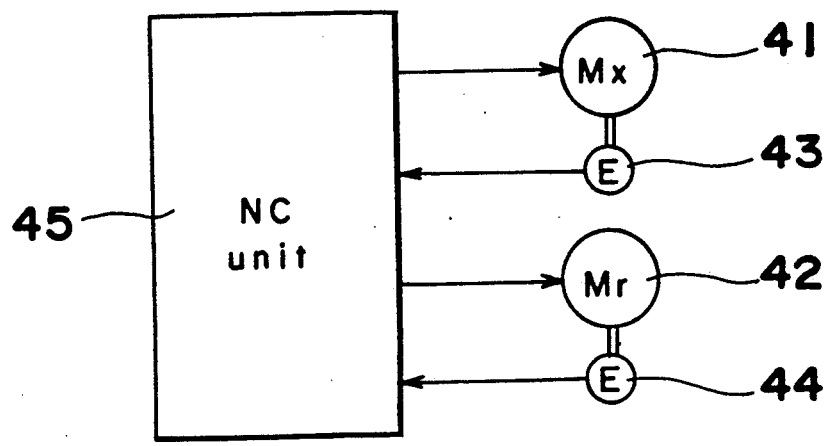
FIG. 2 is a schematic view of a prior art synchronous drive unit (already referred to)
Figure 3:
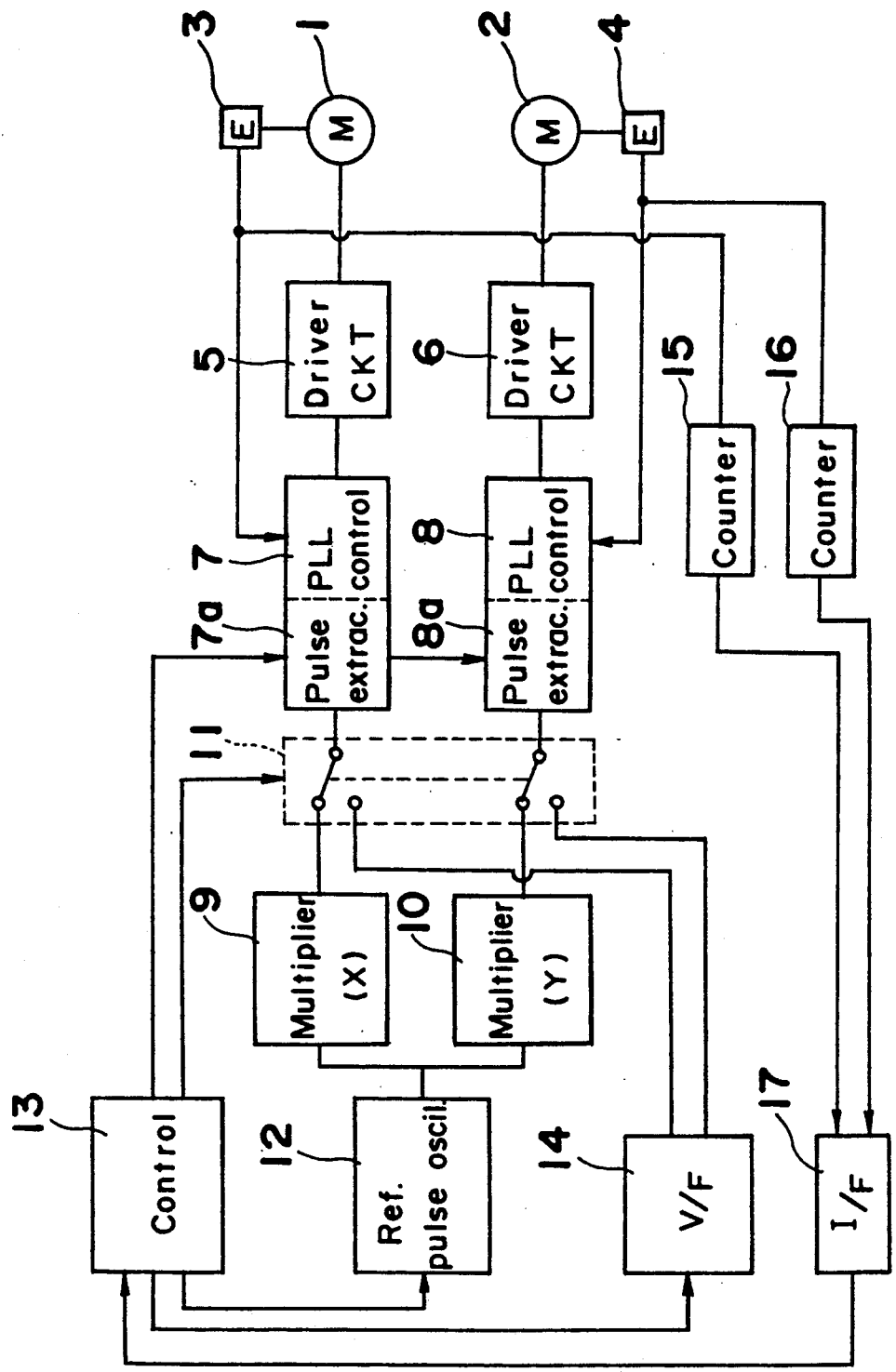
FIG. 3 is a block diagram of a gear shaving machine according to one embodiment of the present invention.
Figure 4:
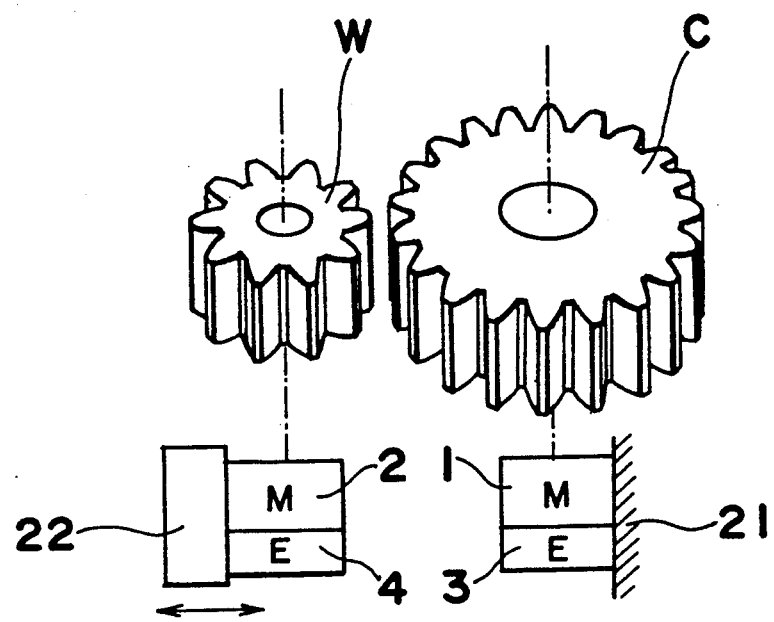
FIGS. 4 and 5 are views explanatory of the operation of the gear shaving machine of FIG. 3 at the time of machining of a gear blank.
Figure 5:
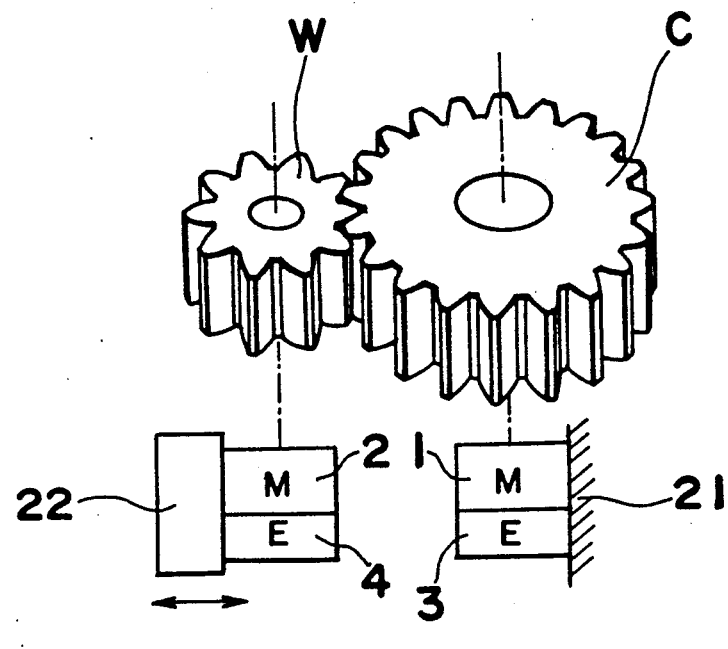

Referring now to the drawings, there is shown in FIGS. 3 to 6, a gear shaving machine employing a multi-spindle synchronous drive unit, according to one embodiment of the present invention. In FIGS. 3 to 5, the gear shaving machine includes a motor 1 for driving a gear cutter C and a motor 2 for driving a gear blank W. The motor 1 is mounted on a fixed base 21, while the motor 2 is mounted on a movable table 22 which is movable towards and away from the fixed base 21. An encoder 3 for detecting rotation of the motor 1 is attached to the motor 1. Likewise, an encoder 4 for detecting rotation of the motor 2 is attached to the motor 2. The motors 1 and 2 are, respectively, driven by driver circuits 5 and 6 whose drive operation is controlled by PLL (phase locked loop) control means 7 and 8, respectively. Detection signals outputted from the encoders 3 and 4 are inputted to the PLL control means 7 and 8, respectively.

The PLL control means 7 detects a phase difference between a predetermined reference pulse signal and the detection signal from the encoder 3 so as to perform feedback control such that a frequency and phase of the predetermined reference pulse signal coincide with those of the detection signal from the encoder 3 at all times. Likewise, the control means 8 detects a phase difference between a predetermined reference pulse signal and the detection signal from the encoder 4 so as to perform feedback control such that frequency and phase of the predetermined reference pulse signal coincide with those of the detection signal from the encoder 4 at all times. In the PLL control means 7 and 8, a rotation command pulse and each of feedback pulses outputted from the encoders 3 and 4 are inputted to a PLL control circuit through a signal processing circuit and an output signal from the PLL control circuit is converted into an analog signal by a D/A (digital-analog) converter. Subsequently, the analog signal is amplified by a PID (proportional-integral-derivative) amplifier and then, a signal from an F/V (frequency-voltage) converter is applied to the amplified signal such that stability of control is obtained. Thereafter, the signal is amplified by an amplifier so as to be outputted as a current command signal to each of the motors 1 and 2. Since the PLL control means 7 and 8 per se are known, further detailed description thereof is abbreviated for the sake of brevity. Pulse extracting circuits 7a and 8a are, respectively, provided in the PLL control means 7 and 8 so as to extract a desired number of pulses from a speed command pulse signal in response to a command from a control portion 13 in accordance with a depth of cut of the gear cutter C at the time of machining of the gear blank W. Furthermore, in the pulse extracting circuits 7a and 8a, the number of pulses extracted during a unit time period in response to the command from the control portion 13 is set by the command from the control portion 13 so as to be proportional to a ratio of a rotational speed of the gear cutter C at the time of machining of the gear blank W to a reference rotational speed of the gear cutter C. Namely, assuming that character N denotes the number of pulses extracted during the unit time period, character A denotes a total depth of cut, character t denotes a standard time period required for machining the gear blank W at the depth A of cut, character n denotes the number of pulses per unit depth of cut, character S denotes a reference rotational speed of the gear cutter C obtained at the time of standard machining and character X denotes a rotational speed of the gear cutter C at the time of machining, the following relation is given.

$$N = (A \times n/t) \times (X/S)$$

Pulses are extracted by the pulse extracting circuits 7a and 8a at rate of N pulses. Multipliers 9 and 10 having multiplication factors X and Y, respectively output their reference pulse signals to the PLL control means 7 and 8, respectively, via a switching means 11. An output pulse from a reference pulse oscillator 12 is applied to the multipliers 9 and 10. The multiplication factors X and Y of the multipliers 9 and 10 can be set arbitrarily. Meanwhile, the reference pulse oscillator 12 is arranged to output a reference pulse of a predetermined frequency determined by a command signal from the control portion 13. Two output signals of a V/F (voltage-frequency) converter 14 are, respectively, inputted to the PLL control means 7 and 8 by way of the switching means 11. Counters 15 and 16 detect rotational positions of the motors 1 and 2, respectively. Output signals of the counters 15 and 16 are inputted to the control portion 13 through an interface 17.

Hereinbelow, the operation of the gear shaving machine is described. When the gear stock W is machined by the gear shaving machine, the gear stock W is mounted on a spindle driven by the motor 2 in a state where the movable table 22 is spaced away from the fixed base 21 as shown in FIG. 4. Then, by rotating the motor 2 slightly, the phase of teeth of the gear stock W is caused to coincide with that of the gear cutter C. Subsequently, the counters 15 and 16 are reset so as to determine starting-points of the motors 1 and 2, respectively. Then, the motors 1 and 2 are started as will be described later. When rotational speeds of the motors 1 and 2 have reached predetermined values, respectively, the motors 1 and 2 are synchronously driven at fixed speeds by the PLL control means 7 and 8, respectively.

When the motors 1 and 2 are set in a state of synchronous drive at fixed speeds, the movable table 22 is moved towards the fixed base 21 as shown in FIG. 5 such that a distance between an axis of the gear cutter C and that of the gear blank W is set at a predetermined value. At this time, the since phase of teeth of the gear blank W is caused to coincide with that of the gear cutter C as described above, the gear blank W and the gear cutter C are brought into proper engagement with each other without any interference therebetween and thus, machining of the gear blank W by the gear cutter C is started.

In the above described state of the synchronous drive of the motors 1 and 2 at fixed speeds, the reference pulse of, for example, several hundreds KHz is multiplied by the multipliers 9 and 10 at the multiplication factors X and Y inversely proportional to the number of teeth of the gear cutter C and the number of teeth of the gear blank W such that peripheral speed of the gear cutter C coincides with that of the gear blank W. Furthermore, in order to minimize machining time, the frequency of the reference pulse or the multiplication factors are set such that either one of the motor C for driving the gear cutter 1 and the motor 2 for driving the gear stock W is rotated at its maximum rotational speed.

The speed command pulse signals multiplied by the multipliers 9 and 10 are inputted, as the reference pulses, to the PLL control means 7 and 8, respectively. Drive of the motors 1 and 2 is controlled such that the detection signals of the encoders 3 and 4 are synchronized with the reference pulse signals, respectively, so that the gear cutter C and the gear blank W are synchronously rotated at predetermined rotational speeds.

On the other hand, rotational phases of the motors 1 and 2 are detected by the counters 15 and 16 and are inputted to the control portion 13. Since the gear blank W is machined by the gear cutter C by sequentially shifting the rotational phases of the motors 1 and 2 through a predetermined amount at a time, the signals are outputted from the control portion 13 to the pulse extracting circuits 7a and 8a such that the pulse signals inputted to the PLL control means 7 and 8 are extracted by the pulse extracting circuits 7a and 8a, respectively. Thus, the reference pulses which have shifted the rotational phases of the motors 1 and 2 are inputted to the PLL control means 7 and 8, respectively. Accordingly, the gear cutter C and the gear blank W are driven so as to be synchronously rotated in a state where the cutter gear C and the gear blank W are shifted relative to each other through a predetermined rotational angle. Furthermore, the gear cutter C and the gear blank W are rotated at an identical peripheral speed in a state where the gear cutter C is held in contact with the toothed surface of the gear blank W at a predetermined pressure, whereby shaving of the gear blank W by the gear cutter C is performed. The amount of shift of the rotational phases of the motors 1 and 2, i.e. the depth of cut, is gradually increased up to a predetermined value.

Meanwhile, if the speed for extracting pulses, namely the number of pulses extracted during a unit time period, is automatically set in accordance with rotational speed of the gear cutter C, an optimum cutting feed rate is automatically set by merely setting either one of the motors 1 and 2 at its maximum speed as described above and thus, it becomes possible to easily minimize machining time. Namely, as the peripheral speed of the gear cutter C and the gear blank W is increased as much as possible within permissible range of rotational speed of the motors 1 and 2, the gear blank W can be machined faster, so that the cutting feed rate can be increased accordingly and thus, machining of the gear blank W can be completed in a short period of time. furthermore, if the peripheral speed of the gear cutter C and the gear blank W is increased, wear or fracture of the gear cutter C can be lessened advantageously.

When machining of the gear blank W has been finished by completing a predetermined amount of cutting of the gear blank W, the movable table 22 is again moved away from the fixed base 21 as shown in FIG. 4. Then, the machined gear blank W is removed from the spindle and an unmachined gear blank W is mounted on the spindle. By repeating the above described operations, the gear blanks W can be sequentially machined.

Figure 6:
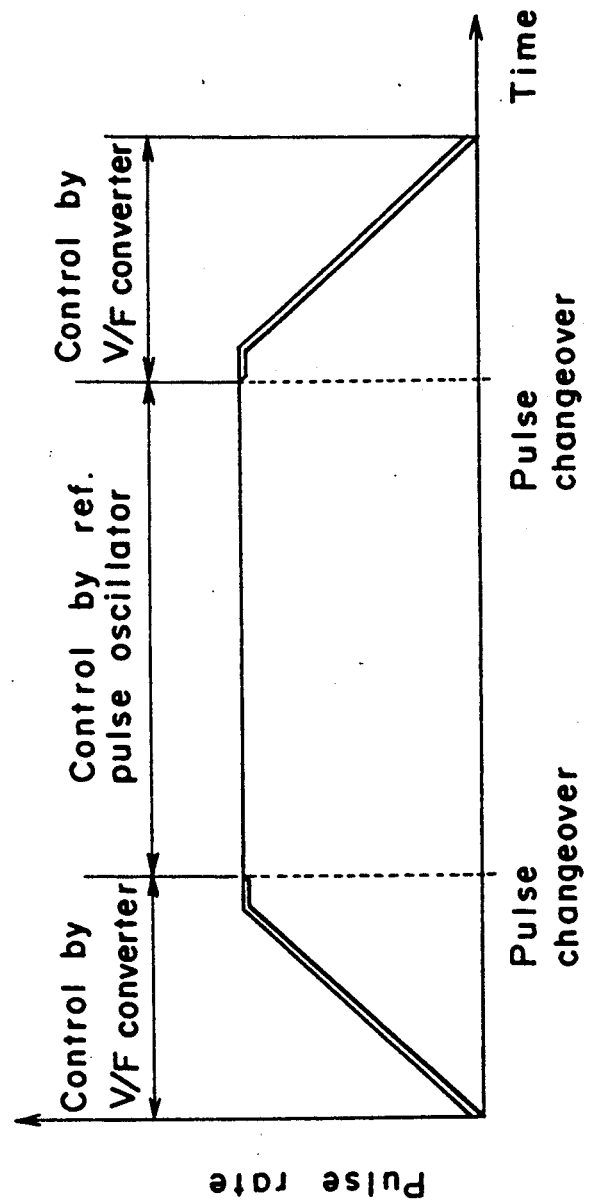
FIG. 6 is a diagram showing a pulse signal of the gear shaving machine of FIG. 3.

Hereinbelow, drive control of the gear shaving machine at the time of speed change such as start, stop, etc. is described. At the time of start, the switching element 11 is changed over to the V/F converter 14 from the multipliers 9 and 10 and an electrical signal corresponding to a command speed of each moment based on a desired speed diagram is inputted from the control portion 13 to the V/F converter 14. Pulse signals of frequencies corresponding to the command signals varying every moment as shown in FIG. 6 are outputted, as reference pulse signals, from the V/F converter 14 to the PLL control means 7 and 8. Thus, drive of the motors 1 and 2 is controlled by the PLL control means 7 and 8, respectively, such that the motors 1 and 2 are rotated at a speed corresponding to the command speed. When the motors 1 and 2 are stably rotated at speeds in close vicinity to predetermined numbers of rotation, respectively, the switching means 11 is changed over to the multipliers 9 and 10 such that the above mentioned synchronous drive control of the motors 1 and 2 at fixed speeds is started.

On the contrary, at the time of stop, pulse signals outputted from the V/F converter 14 are caused to correspond to the numbers of pulses outputted from the multipliers 9 and 10, respectively. Subsequently, the switching means 11 is changed over to the V/F converter 14. Thereafter, frequencies of pulses outputted from the V/F converter 14 are gradually lowered in accordance with the speed diagram so as to stop the motors 1 and 2. Other speed change steps are performed similarly.

It should be noted that the multi-spindle synchronous drive unit of the present invention is applied to the gear shaving machine in the above described embodiment, but such can also be applied to other apparatuses in which two or more arbitrary spindles are driven synchronously.

As is clear from the foregoing description, in the multi-spindle synchronous drive unit of the present invention, the pulse signal from the common pulse oscillator is multiplied by the multiplication factors proportional to the rotational speeds of the respective spindles so as to obtain the speed command pulse signals sich that the speed command pulse signals are. respectively, inputted to the PLL control means, whereby feedback control of the motors for driving the respective motors is performed by the PLL control means.

Accordingly, in accordance with the present invention, the respective spindles can be synchronously driven at an arbitrary speed ratio. Meanwhile, since the control value does not have the fraction produced in the NC unit and PLL control enabling highly accurate rotational control is performed, it becomes possible to perform a highly accurate synchronous drive of the motors. Furthermore, since the speed command pulse signals of the frequencies in the predetermined range are obtained by multiplying the pulse signal outputted from the reference pulse oscillator, the pulse signal outputted from the reference pulse oscillator may be of a low frequency, thereby resulting in a reduction of production costs of the multi-spindle synchronous drive unit.

Furthermore, in accordance with the present invention, if the speed command signal is inputted to the PLL control means through the switching means at the time of speed change by using the V/F converter, change-over between synchronous drive of the motors at fixed speeds and drive of the motors at the time of speed change can be smoothly performed by the simple arrangement.

Moreover, in the gear cutting machine of the present invention, since the above mentioned multi-spindle synchronous drive unit is applied to synchronous drive of the gear cutter and the gear blank of the gear cutting machine, high precision machining of the gear can be performed. Since the amount of shift of the rotational phases of the motors at the time of machining can be set at an arbitrary value by the pulse extracting means, an optimum amount of shift of the rotational phases can be obtained.

In addition, the number of pulses extracted during a unit time period is set so as to a be proportional to ratio of the rotational speed at the time of machining to the predetermined reference rotational speed. Thus, if any one of the motors is set at its maximum rotational speed in order to minimize machining time, a cutting feed rate corresponding to peripheral speed of the workpiece at that time is automatically set, so the that cutting feed rate leading to minimum machining time can be automatically set, thereby minimizing machining time of the gear.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A multi-spindle synchronous drive unit for synchronously driving a plurality of spindles, comprising:
   a plurality of motors for respectively driving said spindles;
   a plurality of encoders for respectively detecting rotational positions of said plurality of motors and for respectively outputting corresponding detection signals;
   a plurality of phase locked loop control means for respectively controlling a driving of said plurality of motors and for respectively receiving as feedback signals the detection signals respectively output by said plurality of encoders;
   a reference pulse oscillator for outputting a pulse signal; and
   a plurality of multipliers for respectively multiplying the pulse signal by multiplication factors corresponding to rotational speed ratios of said spindles, and for respectively outputting corresponding speed command pulse signals to said phase locked loop control means.

2. A multi-spindle synchronous drive unit as claimed in claim 1, further comprising:
   a voltage-frequency converter for outputting pulse signals of frequencies respectively corresponding to varying command speeds; and
   a switching means through which the pulse signals of said voltage-frequency converter are inputted to said phase locked loop control means.

3. A multi-spindle synchronous drive unit as claimed in claim 1 or 2:
   wherein the plurality of spindles include first and second spindles respectively coupled to a gear cutter and a gear blank of a gear cutting machine;
   wherein said plurality of motors include first and second motors for respectively driving the gear cutter and the gear blank;
   wherein said plurality of phase locked loop control means includes first and second phase locked loop control means for respectively controlling a drive of said first and second motors; and
   said drive unit further comprising a pulse extracting means, provided for at least one of said first and second phase locked loop control means, for extracting pulses from a corresponding one of the speed command pulse signals in accordance with an amount of shift of a rotational phase of a corresponding one of said first and second motors during machining of the gear blank.

4. A multi-spindle synchronous drive unit as claimed in claim 3, wherein the number of pulses extracted during a unit time period by said pulse extracting means is set to be proportional to a ratio of a rotational speed of said gear cutter during machining to a reference rotational speed of said gear cutter.

* * * * *